(12) United States Patent
Poirier

(10) Patent No.: US 6,337,015 B1
(45) Date of Patent: Jan. 8, 2002

(54) REFRIGERATOR-MOUNTED WATER FILTRATION APPARATUS

(75) Inventor: Malcolm D. Poirier, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/659,142

(22) Filed: Sep. 11, 2000

Related U.S. Application Data

(60) Provisional application No. 60/156,727, filed on Sep. 30, 1999.

(51) Int. Cl.[7] .................... B01D 24/10; B01D 35/02; F25D 23/12
(52) U.S. Cl. .............. 210/232; 210/285; 210/286; 210/443; 210/473; 210/502.1; 210/506; 210/282; 222/189.06; 62/339
(58) Field of Search .................. 210/232, 263, 210/282, 285, 286, 416.3, 443, 473, 501, 502.1, 503, 504, 506; 222/146.6, 189.06, 189.11; 62/338, 339

(56) References Cited

U.S. PATENT DOCUMENTS

| 671,684 A | * | 4/1901 | Xander |
| 992,921 A | * | 5/1911 | Stevens |
| 3,693,368 A | * | 9/1972 | Miller |
| 3,982,406 A | | 9/1976 | Hanson et al. |
| 4,207,994 A | | 6/1980 | Offlee, Sr. |
| 4,571,953 A | | 2/1986 | Caruso |
| 4,687,120 A | * | 8/1987 | McMillin |
| 5,078,874 A | * | 1/1992 | Sullivan |
| 5,083,442 A | | 1/1992 | Vlock |
| 5,135,645 A | | 8/1992 | Sklenak et al. |
| 5,225,078 A | | 7/1993 | Polasky et al. |
| 5,290,442 A | | 3/1994 | Clack |
| 5,320,752 A | | 6/1994 | Clack et al. |
| 5,454,944 A | | 10/1995 | Clack |
| 5,484,510 A | | 1/1996 | Hartman et al. |
| 5,542,265 A | * | 8/1996 | Rutland |
| 5,560,393 A | | 10/1996 | Clack |
| 5,567,461 A | * | 10/1996 | Lehrer |
| 5,707,518 A | | 1/1998 | Coates et al. |
| 5,715,699 A | | 2/1998 | Coates |
| 5,785,848 A | * | 7/1998 | Strand |
| 5,826,854 A | * | 10/1998 | Janvrin et al. |
| 5,918,773 A | * | 7/1999 | Donovan et al. |
| 6,158,227 A | * | 12/2000 | Seeley |

FOREIGN PATENT DOCUMENTS

| WO | 9713041 | 4/1997 |

OTHER PUBLICATIONS

International Search Report dated Jan. 23, 2001.

* cited by examiner

Primary Examiner—David A. Simmons
Assistant Examiner—Fred Prince
(74) Attorney, Agent, or Firm—Dority & Manning, P.A

(57) ABSTRACT

The present invention provides a water filtration apparatus for mounting on the exposed exterior surfaces of a refrigerator to provide filtered water to the interior of a refrigerator cabinet. The apparatus may be mounted on the exposed or visible surfaces of the refrigerator for ease of installation, monitoring, and filter replacement. A readily replaceable filter cartridge is also provided.

21 Claims, 2 Drawing Sheets

REFRIGERATOR-MOUNTED WATER FILTRATION APPARATUS

PRIORITY CLAIM

The present application hereby claims priority based on Provisional Application Serial No. 60/156,727, filed Sep. 30, 1999.

FIELD OF THE INVENTION

The present invention relates to a water filtration apparatus for mounting on the exposed or visible exterior surfaces of a refrigerator. More specifically, the present invention is an apparatus with a readily replaceable filter cartridge for providing filtered water to the interior of a refrigerator cabinet so that filtered water is available for the refrigerator's ice maker or chilled water dispenser.

BACKGROUND OF THE INVENTION

Water intended for human consumption is expected to be either free of harmful constituents or contain concentrations of such constituents that are below harmful levels. To provide potable water for use in homes and businesses, municipalities utilize industrial scale processes in an effort to eliminate or reduce harmful constituents present in water drawn from large, naturally occurring water sources. Potable water is also frequently obtained on a smaller size scale from wells and springs and usually without any treatment prior to consumption.

Unfortunately, the potability of a particular water supply is sometimes questionable. The consistency and efficiency of treatment by municipalities may vary due to numerous factors such as heavy rainfall, equipment failures, and usage levels. Depending upon the seriousness of a variation in treatment, a municipality may be forced to notify its consumers that further treatment of the water supplied, e.g. boiling, is required at the point of use before consumption is safe. Water obtained directly from a natural source may also become suspect depending upon environmental conditions near the source. For examples, wells and springs can be contaminated due to rain water run-off washing a contaminant into the source.

Various water filtration devices have been developed. Such devices range from those located at the point-of-use (e.g. the spigot of a kitchen sink, gravity-flow dispensers such as dispensers, and low-pressure dispensers such as sports bottles) to the generally bulkier point-of-entry units hidden from view within the plumbing of a home or office. Many of these devices use activated charcoal in at least one stage of the filtration process. Activated charcoal helps to remove strong odors and tastes from water. More specifically, activated charcoal can remove chlorine and sediment from water.

Generally, the currently available devices for water filtration on a nonindustrial scale may be divided into two categories: point-of-use and point-of-entry filtration systems. Typically, a point-of-entry system provides for the filtration of water at the point where the supply enters a dwelling or area of use. The point-of-entry system filters the entire water supply, and filtered water is then distributed to various points of use after filtration. As an example, a point-of-entry system may be located in the basement, cellar, or other location hidden from plain view. In contrast to point-of-use systems, point-of-entry systems may be larger in physical size because of the volumetric rate of water that must be filtered in order to supply filtered water to all of the points-of-use within a dwelling or other use area. Furthermore, a point of entry system may be less efficient because water may be filtered unnecessarily. For example, the homeowner may desire filtered water for the kitchen and bathrooms but not for outdoor spigots or laundry.

Point-of-use systems, on the other hand, provide for filtration of the water at the point of consumption or application. For example, point-of-use systems may be located at the kitchen sink ensuring that potable, filtered water is used in cooking and kitchen cleaning. Such systems may consist of a device, visible to the user, attached to the end of a faucet. Other systems may consist of a filter located within a pitcher such that water placed into the top of the pitcher filters water through to a bottom compartment for storage until consumption. Still other systems, due to size and bulkiness, may be located under a sink or within a nearby kitchen cabinet.

Point-of-use water filtration systems for refrigerators have also been developed as automatic ice-makers and chilled water faucets or dispensers are now common features on many of the commercially available models. For those consumers not having point-of-entry systems, the water must be filtered prior to ice formation or water dispensing if unwanted contaminants are to be removed before use. Point-of-use filtration systems for use in conjunction with household refrigerators are varied as described below.

For example, U.S. Pat. No. 5,320,752, issued to Clack et al., describes a water purification system employing a modular flat filter assembly for installation inside a freezer door, beside a kitchen cabinet, or on a countertop. The U-shaped filter housing is charged with a granulated filtration medium such as activated charcoal. The filter housing has a plurality of staggered ribs and protrusions formed in the walls of the housing. These features allegedly provide structural support against water pressure within the filter housing and prevent flow channels from forming in the granulated filtration medium. While the filter assembly is described as flat, the use of granular filter media, staggered ribs, and protrusions add bulk and thickness to the filter assembly. Furthermore, the unit is not intended for mounting on the exterior surfaces of the refrigerator where the filter media may be readily accessed and replaced when necessary. Instead, like other point-of-use water filtration systems used in conjunction with refrigerators, the filtration apparatus is difficult to reach and access without moving the refrigerator or opening the refrigerator/freezer doors.

U.S. Pat. No. 3,982,406, issued to Hanson et al., illustrates a refrigerator water storage dispensing system with water filter. The system includes a water storage tank and a filter cartridge assembly that are installed within the interior of a refrigerator for removing undesired constituents from the chilled water stream immediately prior to being dispensed. The filter media is contained within a cartridge constructed from an elongated hollow cylindrical casing or tube. The filter container is described as having an overall height of 13 inches and is filled with a granular material such as granular activated charcoal. The system occupies a substantial amount of space within the interior of the refrigerator cabinet because it requires a location for both the water tank and the filter cartridge. In addition, the filter cartridge is not readily accessible for replacement of the filter media because the cartridge is located within the interior of the refrigerator cabinet and must be accessed by opening the doors to the refrigerator and relocating any food products that might interfere with such access.

U.S. Pat. No. 4,207,994, issued to Offlee, describes a refrigerator system utilizing assemblies to enable dispensing cold water or ice made from purified water. The system consists of a cabinet located near the refrigerator containing a water tank, pump, and filter that is connected by piping to the refrigerator. Another tank may be located within the refrigerator for water storage. When the water level in the refrigerator tank falls below a certain level, the pump is activated and filtered water is pumped from the cabinet into the tank within the refrigerator. Water in the cabinet tank may be passed through a filter and then to the pump. Alternatively, the cabinet tank may be stocked with water that has already been filtered such that no filter is required for the cabinet. This system requires a substantial amount of space near the refrigerator for locating the cabinet. Unlike the present invention, the filter is not located on the exterior of the refrigerator or the cabinet where filter replacement may be more readily facilitated. In addition, this system requires a pump which must be powered and eventually replaced when worn.

U.S. Pat. No. 4,571,953, issued to Caruso, describes a combined refrigerator and water filtration unit. While the filtering apparatus is not specified, chambers for holding a water filtration apparatus are located within the refrigerator compartment. The chambers are illustrated as two large cylinders located within the compartment. As with the other devices described above, the chambers described in U.S. Pat. No. 4,571,953 are not readily accessible for easily changing the filter media. In addition, the water filtration units appear to occupy a large volume of the refrigerator cabinet.

U.S. Pat. No. 5,135,645, issued to Sklenak et al., is a directed to a refrigerator water filter located in a compartment constructed within the wall of the refrigerator cabinet. A small cover is used to access the filter from the inside compartment of the refrigerator. The filter is illustrated as a cylindrical cartridge. Because of its location within a compartment constructed in the refrigerator wall, the filter media cannot be readily replaced or observed without first opening the refrigerator door and removing or relocating refrigerated items in front of the compartment.

U.S. Pat. Nos. 5,290,442; 5,454,944; and 5,560,393, all issued to Clack, describe a self-contained, purified drinking water refrigerator storage apparatus. A filter assembly is attached to the rear of a water storage container. Means are provided for attaching the apparatus to a faucet. Upon turning on the faucet, water flows through the filter assembly and into the storage container. Once the container is full, the water storage apparatus is disconnected from the faucet and placed into a refrigerator for storage until consumption. As defined, provision must be made for the space occupied by the container and the cylindrically-shaped filter cartridges on the back of the container. Furthermore, replacement of the filter media requires disconnecting tubing from the filter cartridges.

U.S. Pat. Nos. 5,707,518 and 5,715,699, all issued to Coates et al., describe a refrigerator water filter assembly for mounting onto the surfaces of the interior of a refrigerator. The filter cartridge includes a cylindrical filter media located within a housing that is mounted inside the refrigerator. Accordingly, the filter media cannot be replaced or observed without opening the refrigerator door and relocating items near the filter. Additionally, removal of the filter media for replacement requires that a housing be unscrewed and the filter cartridge removed from the housing.

A common deficiency of previous devices for filtering water for refrigerator units is the difficulty of accessibility to the device. Most of the devices discussed above are filtration units that are mounted either inside the refrigerator, inside the refrigerator cabinet shell, or on the rear, unaccessible exterior of the refrigerator. By being mounted in such locations, the filtration units is not easily observable for the purpose of determining when the filter media in the device has reached the end of its useful life. In addition, replacing the filter media is difficult because either the refrigerator doors have to remain open during replacement and stored items must be relocated, or the entire refrigerator must be pulled away from the wall to gain access to the rear exterior. Therefore, there is need for a water filtration apparatus, for use with a refrigerator, that can be readily observed to determine when the filter media is spent and that can be accessed to facilitate filter removal and replacement with a clean filter. Optimally, a need exists for an apparatus that meets these needs while occupying only a minimum amount of space.

SUMMARY OF THE INVENTION

The present invention addresses some of the problems identified above by providing a water filtration apparatus for mounting on the exposed exterior surfaces of a refrigerator. A means of mounting the apparatus onto the exterior surfaces is provided. The apparatus also includes a readily replaceable filter cartridge. Due in part to these features, the water filtration apparatus of the present invention results in improved efficiency in replacement time and required space as compared to existing devices. The inventive device also results in an apparatus that is readily observable to determine whether the filter media has reached the end of its useful life.

To enable the filter cartridge to be readily replaceable, the filter cartridge is releasably connectable, without the use of special tools, to a filter receptacle. The filter cartridge contains a material or combination of materials for removing undesired constituents from the unfiltered water. Because of the ease with which the filter cartridge of the present invention may be replaced and further because of its readily accessible location on the exterior of the refrigerator, the volume of filter media required may be reduced, which allows the overall size of the present invention to be smaller than existing devices. The size may also be reduced through the use of a flat water filter media. Available in sheets that are less than ⅛ inches in thickness, flat water filter media may be used within the filter cartridge of the present invention to substantially reduce its overall size as compared to existing refrigerator water filters that employ a granular filter media in filters that are not as easily accessible.

To use the water filtration apparatus of the present invention, the consumer mounts the housing containing the filter cartridge onto the exterior surface of the refrigerator. An unfiltered water supply is connected to the unfiltered water inlet of the present invention. Water from the unfiltered water inlet flows to the filter receptacle and through the filter media. Filtered water exits the filter media and is supplied to the refrigerator through a filtered water outlet that the consumer connects to the interior of the refrigerator cabinet. The refrigerator is thereby supplied with filtered water to produce ice or to provide chilled water from the refrigerator's water dispenser.

Because the water filtration apparatus of the present invention is mounted on an exposed, easily accessible, and plainly visible surface of the refrigerator cabinet, the consumer may more readily and easily install the present inventive filter cartridge. In addition, an indicator of filter life may be provided with the present invention which is also readily observable because the apparatus is mounted on the exterior of the refrigerator.

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

DETAILED DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In general, the present invention is a water filtration apparatus that is mountable on the exposed exterior surfaces of the refrigerator. The water filtration apparatus provides filtered water to the interior of a refrigerator cabinet so that filtered water is available for the refrigerator's ice maker or chilled water dispenser. By providing for the mounting of the apparatus on the exposed or visible surfaces of the refrigerator, installation, monitoring, and filter replacement are more readily facilitated as compared to existing devices. Filter media is contained within a filter cartridge that is readily replaceable without requiring the consumer to use special tools.

Figure 1:
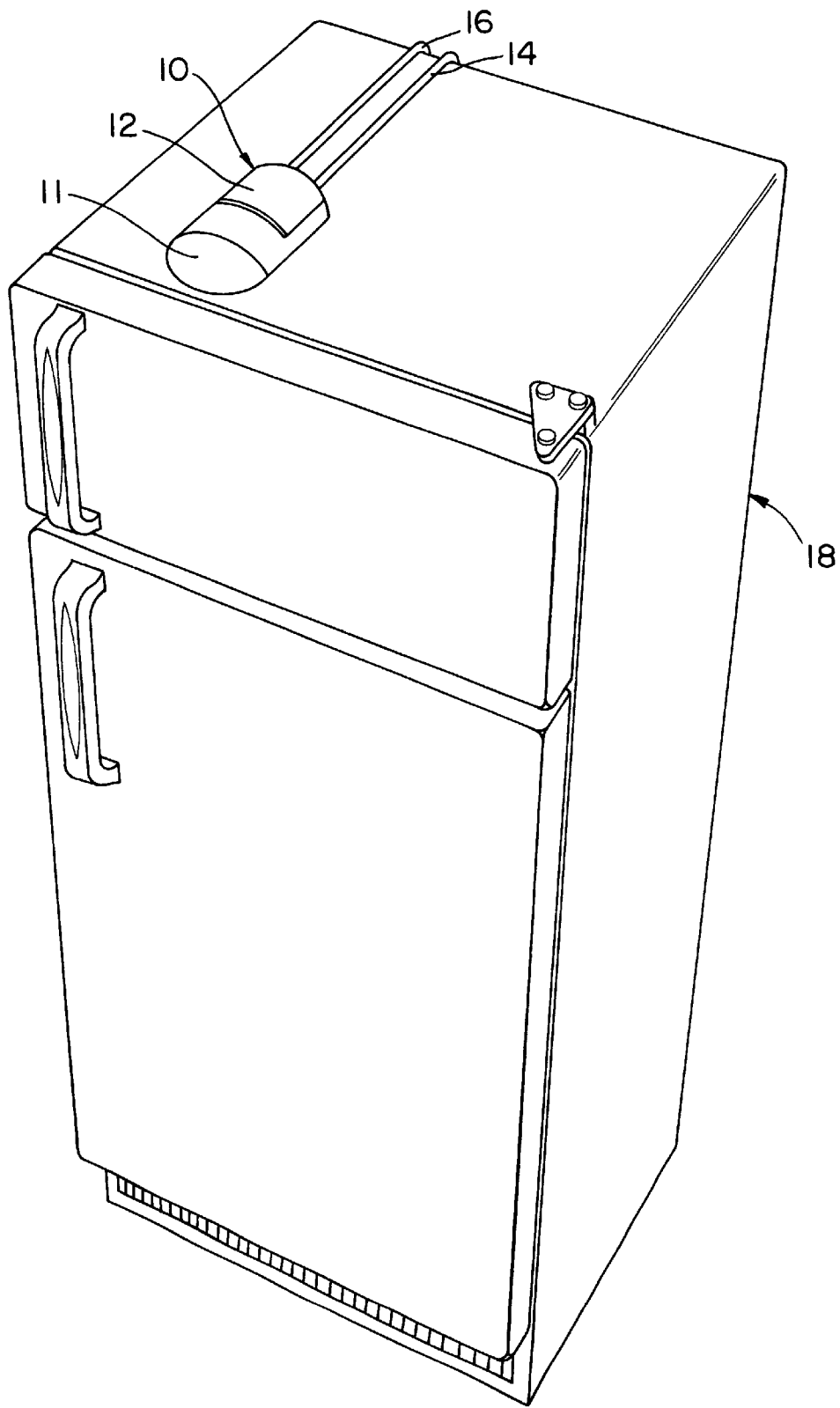
FIG. 1 is a diagrammatic representation of an embodiment of present invention placed on the exposed top surface of a refrigerator.

FIG. 1 illustrates a water filtration apparatus 10 having a housing 11 and a filter cartridge 12 installed into a receptacle for receiving the filter cartridge 12. An unfiltered water supply inlet conduit 14 for supplying unfiltered water and a filtered water outlet conduit 16 for delivering filtered water to the ice and/or water dispenser of the refrigerator 18 are also shown. The unfiltered water supply inlet conduit 14 may consist of the flexible tubing originally connected to the rear of refrigerator 18 for the supply of unfiltered water thereto. Filtered water outlet conduit 16 may be made from the same type of flexible plastic tubing for supplying the filtered potable water to the dispensing mechanisms.

After installation, unfiltered water enters the housing 11 of water filtration apparatus 10 from unfiltered water supply inlet conduit 14. Under the water pressure generally made available for supply to the dispensing units of refrigerator 18, unfiltered water flows through filter cartridge 12 where the filter media housed within the filter cartridge 12 removes undesired constituents. Filtered water then exits the housing 11 of water filtration apparatus 10 to filtered water outlet conduit 16. Filtered water is then provided to the interior of the refrigerator and to the ice-maker or chilled water dispenser housed within the refrigerator interior.

As shown in FIG. 1, the present inventive water filtration apparatus 10 is mounted on the exterior of surface of a refrigerator 18. Such location allows the consumer to readily access the apparatus for replacement of the filter cartridge 12, observe the filter media, or observe an indicator that may be provided with the apparatus for notifying the consumer to replace a used filter media with a new filter media after a certain passage of time or uses. Exterior mounting also makes installation of the filter easier upon the consumer because a separate location away from the refrigerator for mounting the filter is not required and complex structural modification to the rear or exterior of the refrigerator are not necessary.

The housing 11 of the apparatus may be provided with a mounting bracket and fasteners, such as machine screws, for permanently affixing the water filtration apparatus to the exterior of the refrigerator. A surface of housing 11 could, alternatively, contain a strip of adhesive for more adhesively mounting the water filtration apparatus onto the surface of the refrigerator's exposed exterior. Such an adhesive mounting means would not make permanent changes on the refrigerator's exterior and would not require the consumer to use special tools during installation of the apparatus. In another embodiment, the housing 11 of the apparatus may be even provided with a magnetized mounting strip that is applied to the housing with an adhesive. A magnetized mounting strip would allow the consumer to change the location of the water filtration apparatus 10 as desired without permanent changes to the refrigerator exterior or the use of special tools. These are only a few examples of the mounting means for locating the water filtration apparatus 10 on the exterior of a refrigerator 18; other mounting means can be readily envisioned by one skilled in the art using the teachings of this disclosure. The only requirement is that the apparatus 10 be mounted to an exterior surface of the refrigerator that is easily accessible and easily visible to allow for ready replacement of the filter cartridge and viewing of any indicator means on the apparatus.

Various indicator devices may be incorporated into the apparatus so that one may quickly determine whether the filter media has reached its useful life. For example, color indicators, gauge-type indicators, flow rate indicators, electronic indicators and the like may be utilized. It is to be understood that the present invention is not limited to the particular type of indicator that may be employed. The aspects of the present invention allow the user to quickly and easily determine whether the filter media is spent by merely observing the exterior-mounted and unobstructed apparatus.

Figure 2:
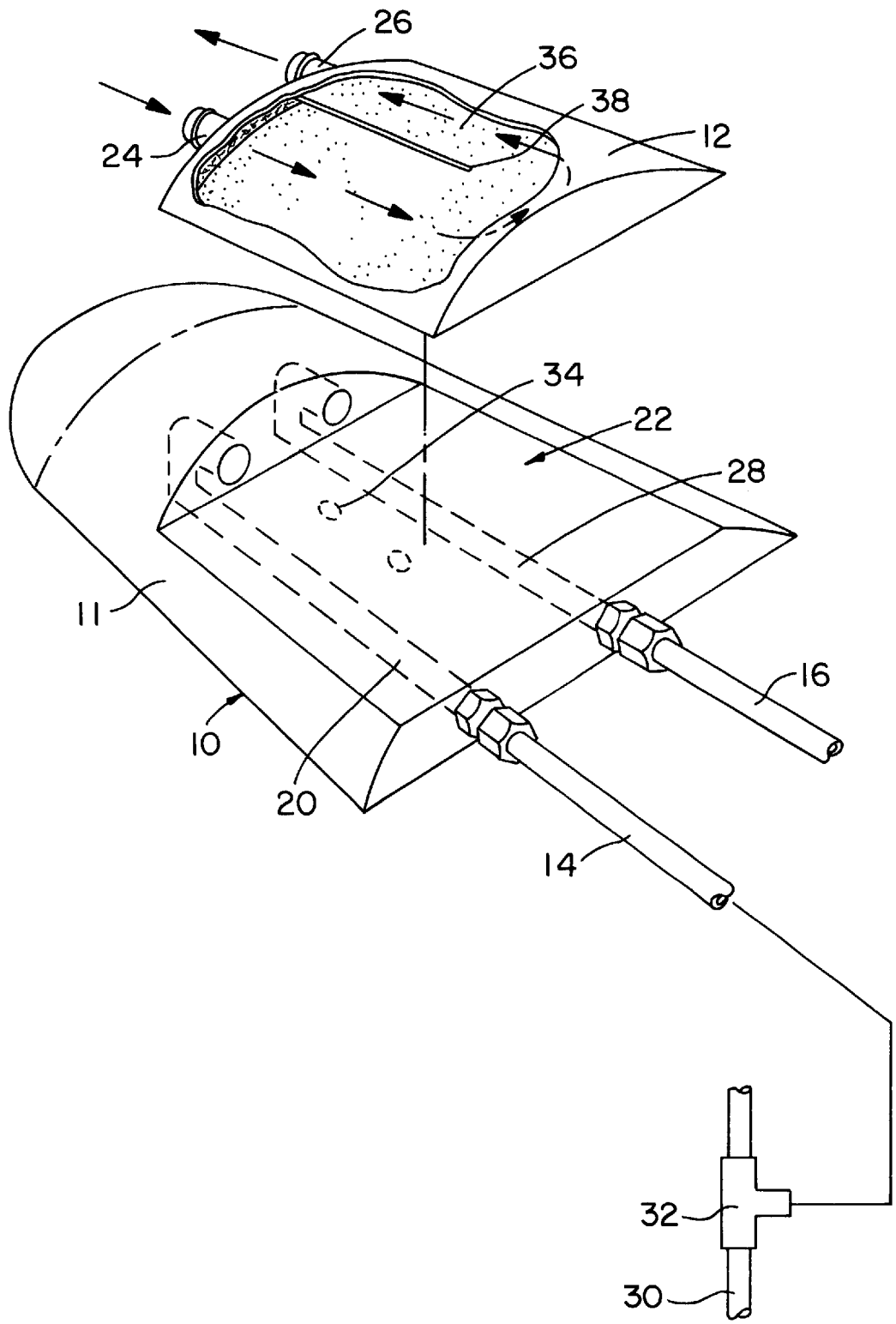
FIG. 2 is diagrammatic representation of an embodiment of the present invention.

FIG. 2 shows the presently inventive water filtration apparatus 10 in more detail. As in the device shown in FIG. 1, water filtration apparatus includes an unfiltered water supply inlet conduit 14 connected to a conduit for supplying unfiltered water 20 to the filter cartridge 12. The filter cartridge is placed into a receptacle 22 defined by housing 11. The filter cartridge 12 is connected to the conduit for supplying unfiltered water 20 by a releasably connectable unfiltered water inlet port 24. The filter cartridge is also connected to the conduit for transporting filtered water 28 away from the receptacle 22 by a releasably connectable filtered water outlet port 26. The filtered water outlet conduit 16 is also connectable to the conduit for transporting filtered water 28 away from the receptacle 22.

Unfiltered water is provided to unfiltered water supply inlet conduit 14 by connecting the conduit to a main unfiltered water supply 30 using a connector 32. A mounting means 34 (such as the machine screw holes shown or an adhesive strip or magnetic strip, etc.) is located on the rear of housing 11 for securing the water filtration apparatus 10 to the exposed surface of the refrigerator.

Upon placing a filter cartridge 12 into receptacle 22, and providing unfiltered water to main unfiltered water supply 30, the filter media contained within filter cartridge 12 of water filtration apparatus 10 removes unwanted constituents from the unfiltered water as follows. Unfiltered water flows from main unfiltered water supply 30, through connector 32, and into unfiltered water supply inlet conduit 14. Flowing through unfiltered water supply inlet conduit 14, the unfiltered water enters housing 10 through the conduit for supplying unfiltered water 20. Unfiltered water then flows to into the filter cartridge 12 by flowing through the unfiltered water inlet port 24. Unfiltered water then flows through the filter media 36, where flow may be directed using a filter wall 38. The unwanted constituents are then removed by the filter media as the water flows through the filter media held within filter cartridge 12.

Filtered water exits filter cartridge 12 though the filtered water outlet port 26 and flows into the conduit for transporting filtered water 28 away from the receptacle 22. Filtered water then flows through filtered water outlet conduit 16 and into the interior of the refrigerator where it may be provided to different compartments for freezing or chilling.

To replace the filter media, the consumer simply removes filter cartridge 12 from the receptacle 22 located in housing 11. An indicator may be provided for notifying or reminding the consumer to replace the filter cartridge 12. By providing a water filtration apparatus that is mountable upon the exterior surfaces of the refrigerator, the consumer may place the apparatus anywhere on the top, sides, or front of the refrigerator. Because the water filtration apparatus may be so located, the consumer can quickly and easily install the apparatus, change the filter cartridge, or monitor an indicator on the filter cartridge to determine if the replacement time is near. Existing devices, installed upon the rear of the refrigerator, the interior of the refrigerator, or within the shell of the refrigerator are more difficult to access. Accordingly, the consumer's efforts to install, monitor, or replace the filter media of existing devices is frustrated.

The filter media 36 located in filter cartridge 12 may be any material or combination of materials that removes undesired constituents from the unfiltered water. By way of example only, the filter media may include activated carbon, which may remove sediment, chlorine, certain metal ions, organics, and other constituents that may pose a health risk or simply cause an undesirable smell or taste. The filter media may contain more than one active material—such as activated carbon in conjunction with charge-modified filter media, such as charge-modified meltblown or microfiber glass webs. Such webs may have fiber diameters in the range of 10 microns or less with pores size in the same range.

Because the filter cartridge 12 of the present invention is readily accessible and therefore readily replaceable, the volume of filter media 36 required for filtration may be reduced. Rather than extending the interval between replacement times by using relatively large quantities of inaccessible and inconvenient filter media, the present invention allows for easy replacement of a filter cartridge and therefore requires less filter media than used in existing devices. Accordingly, if the filter media is a granular material such as granular activated charcoal, the filter cartridge 12 of the present invention may be smaller than existing devices because it can be more readily replaced more often.

The use of a flat water filter media within the filter cartridge 12 also allows the filter media, and therefore the filter cartridge 12, of the present invention to be smaller than existing devices. A flat water filter media can be constructed from any material capable of removing the particular unwanted constituents from the unfiltered water supply. Furthermore, the flat water filter media may consist of a laminate of filter media where different layers remove different constituents or support the filter media. Laminated filter media includes a layer of activated carbon contained between two sheets of support material may be utilize to form relatively flat sheets.

As used with respect to the present invention, "flat" means that a flat water filter media may be readily constructed for use in the embodiments of FIG. 1 and FIG. 2 with a total filter media volume that is less than about 6 cubic inches or with a greatest length to thickness ratio of greater than about 45 to 1. Although the present water filtration apparatus is not limited to the use of such flat filter media, practical advantages may be realized from the use of such flat filter media. In other embodiments of the flat filter media, the total filter media volume will be less than about 1.0 cubic inches or have a length to thickness ratio of greater than about 90 to 1. For example, K-X Industries manufactures a filter media under the name of PLEKX from which flat filter media 36 may be readily constructed. In addition, while a rectangular-shaped filter cartridge is depicted in FIG. 1 and FIG. 2, any shape may be used depending upon what is aesthetically pleasing to the consumer.

The unfiltered water supply inlet conduit 14 and filtered water outlet conduit 16 are releasably connectable from housing 11. As used in the present application, connectable means allow the unfiltered water supply inlet conduit 14 and filtered water outlet conduit 16 to be connected and disconnected repeatedly with a connection that prevents water leakage and does not require any permanent physical alterations to the apparatus. For example, the unfiltered water supply inlet conduit 14 and filtered water outlet conduit 16 may be connected to the filter housing using brass male to female connectors with ferrules capable of sealing the tubings to the housing 11. This allows for the easy installation of the water filtration apparatus. Furthermore, once the apparatus is mounted on the refrigerator by the consumer, disconnecting the unfiltered water supply inlet conduit 14 and filtered water outlet conduit 16 is not required for changing the filter cartridge.

Similarly, the unfiltered water inlet port 24 and the filtered water outlet port 26 are also releasably connectable to the conduit for supplying unfiltered water 20 and the conduit for transporting filtered water away from the receptacle 22. As with the releasably connecting means for the inlet and outlet ports, the connecting means for these components allow repeated connections and disconnections without permanently altering the physical structure of the refrigerator surfaces while, at the same time, preventing water leakage. For example, the unfiltered water inlet port 24 and the filtered water outlet port 26 may be connected to receptacle 22 using a combination of rubber O-rings that secure the filter cartridge 12 into receptacle 22 while providing a leak free connection. Other types of sealable connections such as slip-on connectors, brass male/female connectors with ferrules, etc., may also be utilized.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A water filtration apparatus for mounting on the exposed exterior surfaces of a refrigerator, said apparatus comprising:

a housing defining a receptacle for receiving a replaceable filter cartridge, said housing having an unfiltered water inlet and a filtered water outlet, said housing further comprising a substantially flat side mountable generally flush against a flat exterior surface of the refrigerator and said receptacle defining a substantially flat receiving surface for said filter cartridge;

said unfiltered water inlet being connectable to a conduit for supplying unfiltered water to said receptacle and said filtered water outlet being connectable to a conduit for transporting filtered water away from said receptacle;

said filter cartridge comprising a filter media and being releasably connectable to said receptacle through an unfiltered water inlet port and a filtered water outlet port, said filter cartridge including a substantially flat back surface which rests against said flat receiving surface defined in said receptacle; and a mounting means located upon said substantially flat side of said housing for mounting said housing to an exposed exterior surface of a refrigerator.

2. The water filtration apparatus of claim 1, wherein the water filter media comprises activated carbon.

3. The water filtration apparatus of claim 2, wherein said filter media comprises a flat water filter media.

4. The water filtration apparatus of claim 3, wherein said flat water filter media has a total volume of less than about 3 cubic inches.

5. The water filtration apparatus of claim 3, where said flat water filter media has a greatest length to thickness ratio of greater than about 15 to 1.

6. The water filtration apparatus of claim 3, wherein the flat water filter media comprises activated carbon.

7. The water filtration apparatus of claim 3 wherein said flat filter media has a total volume of less than about 3 cubic inches and has a greatest length to thickness ratio of greater than about 15 to 1.

8. The water filtration apparatus of claim 1, further comprising a flexible hose releasably connected to said unfiltered water inlet and a flexible hose releasably connected to said filtered water outlet.

9. A refrigerator having a water or ice dispensing unit that is accessible without opening a door to the refrigerator, said refrigerator comprising the water filtration apparatus of claim 8 mounted on an exposed exterior surface of said refrigerator, said water filtration apparatus being connected to said water or ice dispensing unit so that filtered potable water is supplied thereto.

10. The water filtration apparatus of claim 1, wherein the mounting means attached to said housing for mounting said housing to an exposed exterior surface of a refrigerator is a magnet attached to said housing.

11. The water filtration apparatus of claim 1, wherein the mounting means attached to said housing for mounting said housing to an exposed exterior surface of a refrigerator is an adhesive tape attached to said housing.

12. The water filtration apparatus of claim 1, wherein the mounting means attached to said housing for mounting said housing to an exposed exterior surface of a refrigerator are screws for attaching said housing to said refrigerator surface.

13. A refrigerator having a water or ice dispensing unit that is accessible without opening a door to the refrigerator, said refrigerator comprising the water filtration apparatus of claim 1 mounted on an exposed exterior surface of said refrigerator, said water filtration apparatus being connected to said water or ice dispensing unit so that filtered potable water is supplied thereto.

14. The refrigerator of claim 13, wherein said water filtration apparatus is mounted on the top exterior surface of said refrigerator.

15. The refrigerator of claim 13, wherein said water filtration apparatus is mounted on a side exterior surface of said refrigerator.

16. The refrigerator of claim 13, wherein said water filtration apparatus is mounted on the front exterior surface of said refrigerator.

17. A water filtration apparatus for mounting on the exposed exterior surfaces of a refrigerator, said apparatus comprising:

a housing defining a receptacle for receiving a filter cartridge, said housing having an unfiltered water inlet and a filtered water outlet;

said unfiltered water inlet being connectable to a conduit for supplying unfiltered water to said receptacle and said filtered water outlet being connectable to a conduit for transporting filtered water away from said receptacle;

said filter cartridge comprising a flat water filter media comprising activated carbon and being releasably connectable to said receptacle through an unfiltered water inlet port and a filtered water outlet port;

a mounting means located upon said housing for mounting said housing to an exposed exterior surface of a refrigerator; and wherein said flat water filter media comprises a laminate of filter media.

18. The water filtration apparatus of claim 17, wherein said flat water filter media has a total volume of less than about 3 cubic inches.

19. The water filtration apparatus of claim 17, where said flat water filter media has a greatest length to thickness ratio of greater than about 15 to 1.

20. The water filtration apparatus of claim 17 wherein said flat filter media has a total volume of less than about 3 cubic inches and has a greatest length to thickness ratio of greater than about 15 to 1.

21. A refrigerator having a water or ice dispensing unit that is accessible without opening a door to the refrigerator, said refrigerator comprising the water filtration apparatus of claim 17 mounted on an exposed exterior surface of said refrigerator, said water filtration apparatus being connected to said water or ice dispensing unit so that filtered potable water is supplied thereto.

* * * * *